INVENTORS
RICHARD D. HOUK
EMMOR V. SCHNEIDER
BY Woodling and Knost,
ATTORNEYS

Oct. 7, 1958

E. V. SCHNEIDER ET AL 2,855,478

ELECTRICAL SWITCH

Filed Nov. 12. 1957

2 Sheets-Sheet 2

INVENTORS
RICHARD D. HOUK
EMMOR V. SCHNEIDER
BY
*Woodling and Krost,*
ATTORNEYS

United States Patent Office 2,855,478
Patented Oct. 7, 1958

2,855,478

ELECTRICAL SWITCH

Emmor V. Schneider and Richard D. Houk, Alliance, Ohio, assignors to The Alliance Manufacturing Company, Division of Consolidated Electronics Industries Corporation, Wilmington, Del.

Application November 12, 1957, Serial No. 695,824

12 Claims. (Cl. 200—52)

The invention relates in general to electrical switches and more particularly to a switch responsive to and actuated by relative movement between first and second members.

In many machines electrical switches are utilized, such as limit switches, which control movement of the machine and in turn are controlled by movement of parts of the machine. In many machines a part thereof is capable of being overloaded so that it will become stalled or cease rotation or movement. Under such conditions it is often desirable to electrically determine this condition so as to terminate the drive of this stalled part. This may be for the purpose of preventing burn-out of the electric motor driving the part or it may be merely to shut off a part of the machine because a particular function has been completed. This illustrates a need for a particular form of switch which is a movement responsive switch and can sense the difference between when two parts are relatively moving and when they are relatively stationary.

Accordingly, an object of the invention is to provide a movement responsive switch.

Another object of the invention is to provide an electrical switch sensing when a part is rotating and capable of operating an electrical control system to terminate the drive of the rotating part.

Another object of the invention is to provide an electrical switch function from rotating parts of a machine and utilizing such parts in a dual function as parts of the machine and also as parts of an electric switch.

Another object of the invention is to provide an electrical switch comprised of a rotating shaft in a bearing which may have lubricant therein with an electrical open circuit being provided between the parts when the shaft is rotated and, when the parts cease relative rotation, the shaft penetrates any lubricant therein to provide an electrical short circuit.

Figure 1:
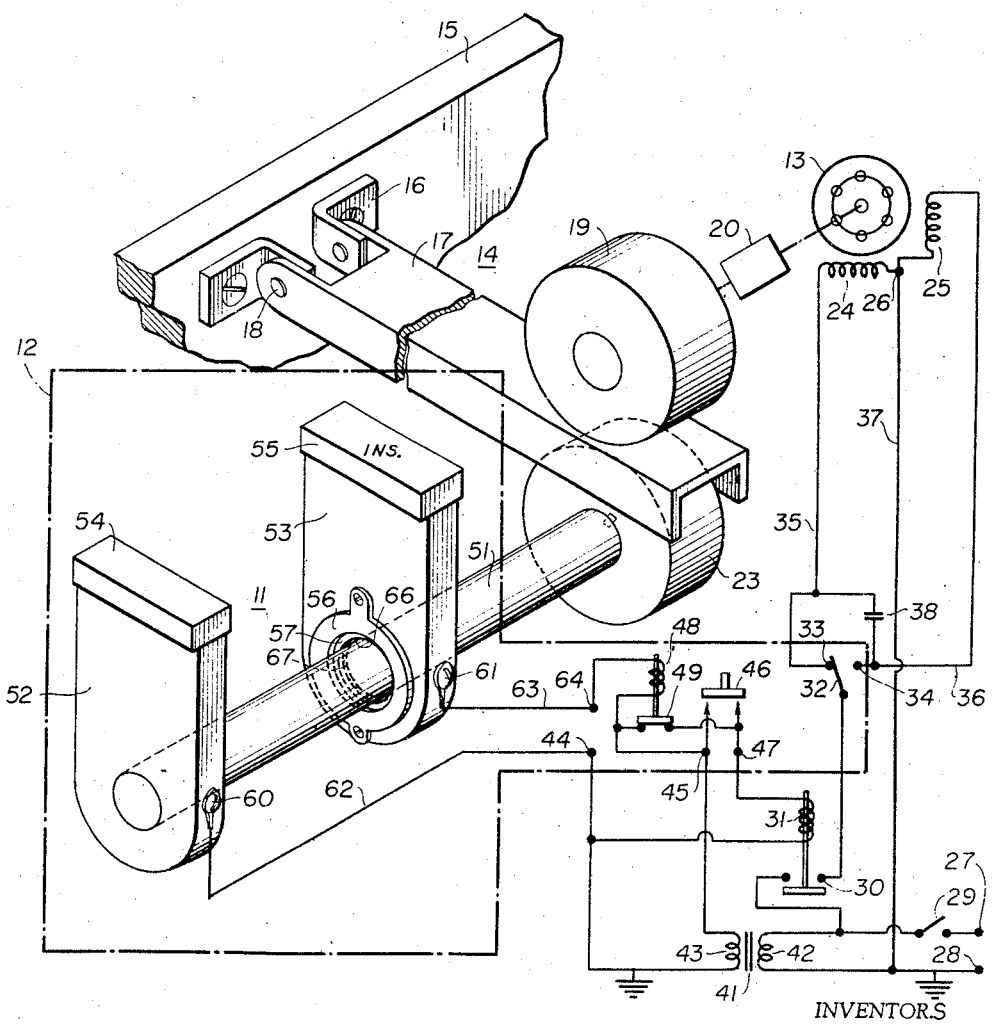
Figure 2:
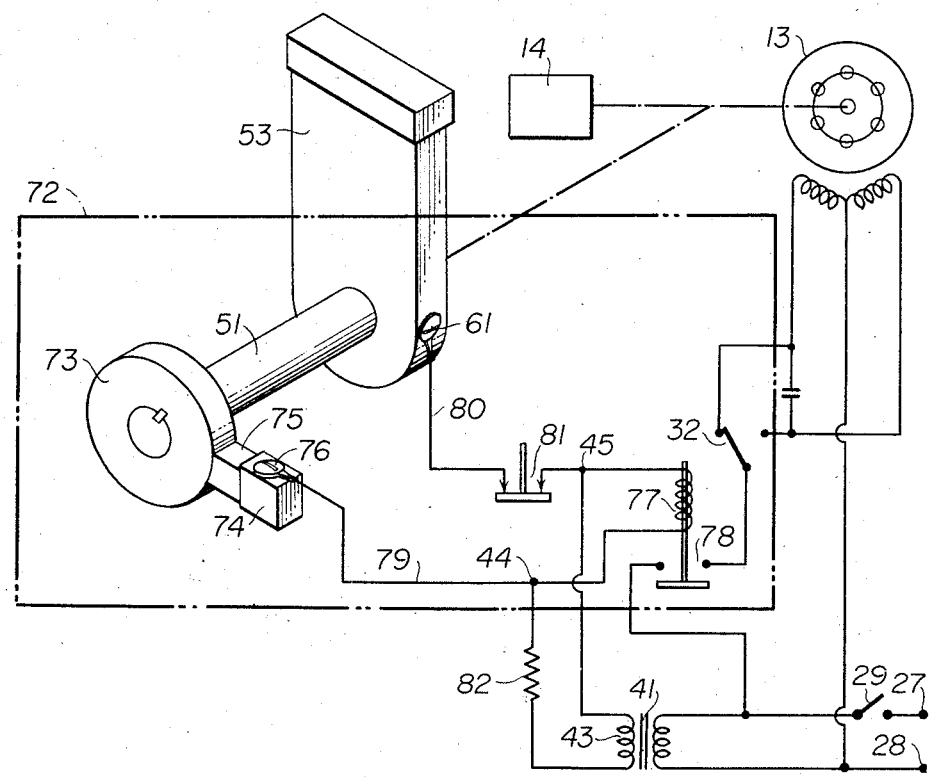

Other objects and a fuller understanding of this invention may be had by referring to the following description and claims, taken in conjunction with the accompanying drawing, in which:

Figure 1 is a combined schematic and diagrammatic showing of an electrical control system embodying the invention; and Figure 2 is a combined schematic and diagrammatic view of a modification of the invention.

The Figure 1 illustrates an electrical switch 11 embodying the invention and incorporated in a control circuit 12. The control circuit 12 may have many electrical functions but in Figure 1, for purposes of illustration only, it has been shown as controlling an electric motor 13 driving a load 14 which has been illustrated as a garage door 15 of the overhead moving type. The tracks or supporting arms for the door 15 have not been shown, these being understood to be of any desired form of which commercially there are many at the present time. A bracket 16 may be fastened to a suitable place on the door, such as the top center, and a channel 17 may be connected to the bracket 16 by a pivot 18. The channel is caused to reciprocate longitudinally to pull or push the door between the fully open position and the fully closed position. The reciprocation of this channel 17 is accomplished by a drive roller 19 driven from the motor 13 through a speed reducing mechanism 20. The drive roller 19 may have a friction surface, such as rubber, to frictionally grip the channel 17; and an idler roller 23 is disposed generally opposite the drive roller 19 so that the combination of the two rollers 19 and 23 squeeze the channel 17 therebetween. This provides a drive engagement from the motor 13 to the channel 17; and yet, upon overload, the roller may slip relative to the channel 17 to provide a form of overload or slipping clutch.

The motor 13 may be of any suitable type and has been illustrated for purposes of illustration in Figure 1 as being a reversible induction motor having first and second field windings 24 and 25 interconnected at a junction 26. Voltage terminals 27 and 28 from a suitable voltage source, such as 115 volts alternating current, may be connected to the motor 13 through a switch 29, through contacts 30 of a power relay 31, and through a reversing switch 32. The reversing switch 32 has first and second double-throw contacts 33 and 34 connected to lines 35 and 36 which are connected to the remote ends of the windings 24 and 25, and a line 37 connects the junction 26 to the voltage terminal 28 to complete the circuit. A capacitor 38 is connected across lines 35 and 36 to illustrate a means of providing reverse rotation to the motor 13. With the switch 32 in the position shown, the winding 24 would be energized with voltage in phase with the line and the winding 25 would be energized through the capacitor 38 for rotation in one direction. With the switch 32 contacting the contact 34, then winding 25 would be energized with voltage in phase with the line and winding 24 would be the winding energized through the capacitor 38 for rotation in the opposite direction.

A transformer 41 has a primary 42 connected across the voltage terminals 27 and 28 and has a secondary 43 energizing the control circuit 12 at terminals 44 and 45. A normally open push button 46 is connected between the terminal 45 and a terminal 47. The power relay 31 is connected between terminals 44 and 47. A control relay 48 has normally closed control contacts 49 connected between terminals 45 and 47.

The idler roller 23 is fixedly carried on a shaft 51. First and second electrically conducting bearing blocks 52 and 53 journal a shaft 51 at spaced locations. Support blocks 54 and 55 support the bearing blocks 52 and 53 on a frame, not shown, which also may carry the motor 13 and speed reducer 20. The support block 55 is of electrical insulating material. The bearing blocks 52 and 53 are preferably sleeve bearings and a lubricating means is shown including a cap 56 fastened to the bearing block 53 and carrying a lubricant saturated washer 57, for instance of felt or like material, surrounding the shaft 51 on one side of the block 53. Any suitable means of lubricating the shaft 51 at bearing block 52 may also be provided.

Terminals 60 and 61 provide electrical connection to the bearing blocks 52 and 53. A conductor 62 connects terminals 60 and 44, and a conductor 63 connects terminal 61 to a terminal 64. The coil of control relay 48 is connected across terminals 45 and 64.

The male surface 66 of the shaft 51 at the point where it is journalled in the bearing block 53 is typically provided with a smooth cylindrical surface to provide a good bearing. The female surface 67 of the bearing block 53 is similarly finished. The clearance between these surfaces 66 and 67 may be of any suitable dimension and it is found that approximately one thousandth of an inch is satisfactory for the purpose of the electrical switch function.

Operation

When the shaft 51 is rotating, an electrical resistance lubricant film is formed between the male and female surfaces 66 and 67 which has been found to be in the order of one-half megohm, and hence, for all practical purposes, is an open circuit condition. When the shaft 51 stops rotation, it very quickly penetrates this lubricant film to come into metal to metal contact with the sleeve bearing 53, and hence, the electrical resistance drops to a fraction of an ohm which, for all practical purposes, is an electrical short circuit condition. These open and closed circuit conditions are utilized in the circuit 12 to control the motor 13, and hence, is a control of the drive of the roller 19 and of the roller 23.

With the switch 29 closed, voltage is applied to the transformer 41. The secondary voltage may be low voltage such as twenty-four volts for safety considerations, and this voltage is applied at terminals 44 and 45. With the shaft 51 at rest, there is an electrical closed circuit condition at the surfaces 66 and 67 and between shaft 51 and bearing block 52 so that there is a low voltage drop between terminals 60 and 61. This means that essentially the full secondary voltage is applied between terminals 45 and 64 to energize the control relay 48 and open the normally closed control contacts 49. Voltage is also available so that when the push button 46 is momentarily closed the power relay 31 is energized to close the power contacts 30. This energizes the motor 13 for whichever direction of rotation has been selected by the reversing switch 32, which is a part of the control circuit 12. The motor 13 then drives the roller 19 through the speed reducer 20 to move the channel 17 longitudinally in a given direction. For example, this may be in a direction to cause the door 15 to close. As the motor 13 starts rotating, this causes movement of the channel 17 and rotation of the idler roller 23. This movement of the shaft 51 causes whatever lubricant is present in the bearing to become a film between the shaft and the bearing to thus provide an electrical open circuit condition between terminals 60 and 61. This causes substantially immediate de-energization of the control relay 48 to close contacts 49 and thus maintain energized the power relay 31 so that the push button 46 need not be depressed but momentarily, just sufficient to get the motor 13 rotating.

When the door is closed, it strikes an obstruction which stops the channel 17 and thus this is an example of some part of a machine which may become overloaded for a stalled condition. With the channel 17 stopped in its movement, the idler roller 23 also stops and the drive roller 19 may or may not cease rotation depending upon the frictional drive condition. The cessation of rotation of the idler roller 23 provides that surfaces 66 and 67 will cease relative movement. In a very short time the transverse force caused by the load on the idler 23 and/or gravity causes the shaft 51 to penetrate any lubricant film at the bearing blocks 52 and 53 to again provide the electrical closed circuit condition between terminals 60 and 61. This energizes the control relay 48 to open control contacts 49, de-energizing the power relay 31, and opening power contacts 30 to de-energize the motor 13. Some means, not shown, is provided within the control circuit 12 to reverse the reversing switch 32 so that upon the next energization of the motor 13 it will drive the roller 19 in the opposite direction to open the door. This reverse rotation of the motor and drive roller 19 and the idler roller 23 provides the same conditions as before; namely, an open circuit between surfaces 66 and 67 with the shaft turning and an electrical closed circuit with the shaft 51 stopped.

In the actual garage door operator constructed the transverse load on the idler roller 23, at the bearings 52 and 53, is about three and one-half pounds caused by the combination of gravity and the spring pressed relative bias of the rollers 19 and 23. The surfaces 66 and 67 may be ground to the cylindrical surface required in this Figure 1 and it has been found that an ordinary ground surface has a finish of about twenty-five micro-inches. This degree of smoothness of the bearing surfaces has been found to be satisfactory to provide the open and closed electrical surface conditions described, with use of an oil lubricant in the felt washer 57 and, of course, in the bearing clearances. With a coarser finish on the bearings and shaft, a lubricant having greater stiffness or viscosity may be required in order to provide maintenance of a lubricant film during rotation of the shaft 51.

More careful grinding of the bearing surfaces has been found to provide surface smoothness of about fifteen to seventeen micro-inches and, of course, this smoother finish is more desirable in the preservation of the open circuit condition with the shaft rotating. With the bearing surfaces being ground and polished, and metal plated if desired, the surface finish may be improved to about a three micro-inch finish. With this degree of smoothness it has been found that an air bearing may result, that is, a film of air may be retained between the shaft and bearing in what appears to be a lubricant free bearing, that is, a bearing free of any lubricant other than air. This air lubricated bearing also has been found to exhibit the same open circuit conditions upon rotation and closed circuit conditions upon cessation of rotation.

The Figure 2 shows a modification of the invention wherein a control circuit 72 is used to control the motor 13. The motor 13 again drives the shaft 51 journalled in the bearing block 53. The shaft 51 may have other bearings not shown. A slip ring 73 is fixedly carried on the shaft 51 and a brush holder 74 carries a brush 75 bearing against the slip ring 73. A terminal 76 is provided on the brush holder 74. The transformer 41 is again energized from voltage terminals 27 and 28 through a switch 29 and the secondary 43 supplies power to control terminals 44 and 45 through a voltage dropping resistor 82. A relay 77 has normally open power contacts 78 connected between the reversing switch 32 and the switch 29. A conductor 79 connects terminals 44 and 76. A conductor 80 and a normally closed push button 81 connects terminals 45 and 61.

Operation

When the switch 29 is closed, transformer 41 is energized to energize terminals 44 and 45 through the voltage dropping resistor 82. The shaft 51 is stationary at this time providing an electrical short circuit between terminals 61 and 76 so that essentially all the voltage of the secondary 43 appears across the resistor 82. When the push button 81 is depressed, this opens the short circuit on terminals 44 and 45, hence, the secondary voltage is applied through resistor 82 to the relay coil 77 to energize same and close contacts 78. This causes the motor 13 to be energized to drive the load 14 as before. As soon as the shaft 51 starts rotating, an open circuit condition is established between terminals 61 and 76; and hence, the push button 81 may be released yet the relay 77 will remain energized. Upon the load or some part thereof becoming stalled to stop the shaft 51, the electrical closed circuit condition will again appear between terminals 61 and 76 to short circuit the relay 77 causing it to drop out and thus de-energize the motor 13. This Figure 2 therefore shows an alternative circuit condition for terminating the drive of part of the load, in this case at least terminating the drive of the shaft 51.

The circuits of Figures 1 and 2 show one of many uses for this movement responsive switch 11 which detects the difference between a stationary part and one just slowly moving or rotating; and in fact, the open circuit condition is maintained even though the shaft is rotating at a very slow or crawl speed. In Figure 1 the block 55 has been shown as insulating, and similarly the block 54 may be an insulating block, if desired, or it may be grounded since in Figure 1 the terminal 44 has been shown as a grounded terminal. In Figure 2 only one bearing and shaft combination has been shown as providing the electrical switch function of the invention, the brush 75 being used to provide electrical connection to the rotating shaft 51. In Figure 1, since in many cases two spaced bearing blocks 52 and 53 will be used to journal the shaft 51, the electrical connection to the shaft 51, at least in the stationary condition of shaft 51, has been provided through the bearing block 52. This is an added saving in parts over that of Figure 2. It will be noticed that the electrical switch of the present invention may be achieved with a minimum of parts and, in fact, duplicate functions of physically journalling the shaft and electrical switching is provided by the bearing block 53 and shaft 51. In the embodiment of Figure 1 the bearing block 52 and the shaft portion journalled therein may be considered as an electrical brush means providing electrical contact to the shaft 51 serving a function similar to the brush 75 of Figure 2.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. An electrical switch to sense the difference between movement and non-movement of first and second relatively movable members comprising, a male surface moved in accordance with said first member, a female surface on said second member journalling said male surface, lubricant means at said journal establishing a running film of sufficient stiffness with respect to the smoothness of finish of said surfaces to establish an electrical open circuit with said surfaces relatively moving, electrical means providing electrical connection to said male surface, terminal means providing electrical connection to said female surface whereby upon said male and female surfaces being relatively stationary said first member penetrates said lubricant film to establish an electrical short circuit between said surfaces.

2. An electrical switch to sense the difference between rotation and non-rotation of first and second relatively rotatable members comprising, a cylindrical male surface rotated in accordance with said first member, a cylindrical female surface on said second member surrounding and journalling said male surface with approximately one thousandth of an inch clearance therebetween, each of said surfaces having a finish smoother than about twenty-five micro-inches, means establishing a transverse force between said first and second members, electrical means providing electrical connection to said male surface, terminal means providing electrical connection to said female surface whereby upon relative rotation of said male and female surfaces a film of lubricant is formed to provide substantially an electrical open circuit between said male and female surfaces and when said male and female surfaces are not relatively rotating said transverse force esatablishes substantially an electrical short circuit between said surfaces.

3. An electrical switch to sense the difference between rotation and non-rotation of first and second relatively rotatable members comprising, a ground cylindrical male surface on said first member, a ground cylindrical female surface on said second member surrounding and journalling said male surface with approximately one thousandth of an inch clearance therebetween, lubricant means at said journal, each of said surfaces being cylindrical with a surface finish in the range of three to twenty-five micro-inches and having a lubricant film therebetween, means establishing a transverse force on said first member relative to said second member, electrical brush means providing electrical connection to said male surface, terminal means providing electrical connection to said female surface whereby upon relative rotation of said male and female surfaces a film of lubricant is formed to provide substantially an electrical open circuit between said male and female surfaces and when said male and female surfaces cease relatively rotating said transverse force causes said first member to penetrate said lubricant film in a relatively short time to establish substantially an electrical short circuit between said surfaces.

4. An electrical control system for use with motive means, comprising, in combination, a frame, a bearing and a shaft journalled therein and carried on said frame for relative rotation as driven by said motive means, at least the journalled cylindrical portion of said shaft being surfaced to a smooth finish, first means making electrical connection with said shaft, second means making electrical connection with said bearing, whereby upon relative rotation of said shaft and said bearing a high electrical resistance exists between said first and second means and upon said shaft and said bearing being relatively stationary a low electrical resistance exists between said first and second means, and means to control said motive means in accordance with the relative change of electrical resistance between said first and second means.

5. An electrical control system for use with motive means, comprising, in combination, a frame, a bearing and a shaft journalled therein and carried on said frame for relative rotation as driven by said motive means, at least the journalled cylindrical portion of said shaft being surfaced to a finish of less than twenty-five micro-inches, first means making electrical connection with said shaft, second means making electrical connection with said bearing, said bearing and shaft portion having a clearance therebetween in the order of one thousandth of an inch, whereby upon relative rotation of said bearing and said shaft a high electrical resistance approximating an open circuit condition exists between said first and second means and upon said shaft and bearing being relatively stationary a low electrical resistance approximating a closed circuit condition exists between said first and second means, and means to control said motive means in accordance with said open and closed circuit conditions.

6. An electrical control system for use with motive means, comprising, in combination, a frame, a rotatable shaft connected to be driven by said motive means, a journal on said frame and journalling a first cylindrical portion of said shaft, at least said first cylindrical portion of said shaft and said journal being surfaced to a finish of less than twenty-five micro-inches, first means making electrical connection with said shaft, second means making electrical connection with said journal, said journal and shaft portion having a clearance therebetween in the order of one thousandth of an inch, whereby upon rotation of said shaft a very high resistance approximating an electrical open circuit condition exists between said first and second means and upon cessation of rotation of said shaft a very low resistance approximating an electrical closed circuit condition exists between said first and second means, and means to control said motive means in accordance with said open and closed circuit conditions.

7. A movement responsive electrical switch, comprising, in combination, first and second members one journalling the other thereof, a smooth cylindrical surface on each said first and second member at said journal, the clearance between said first and second members at said journal being relatively small, and means making electrical connection to each said first and second members whereby upon said members being relatively stationary physical electrical contact is established therebetween by pressing through any lubricant in said journal and whereby upon relative movement therebetween a high resistance lubricant film is established between said members by adhesion of lubricant to each of said members to establish substantially an electrical open circuit condition between said members.

8. A rotation responsive electrical switch, comprising, in combination, first and second members one rotatably journalling the other thereof, a smooth cylindrical surface on each said first and second member at said journal in the range of three to twenty-five micro-inch finish, the clearance between said first and second members at said journal being in the order of one thousandth of an inch, and means making electrical connection to each said first and second members whereby substantially a closed circuit condition exists between said members upon said members being relatively stationary to cut through any lubricant at said journal to make electrical contact, and whereby substantially an open circuit condition exists between said members upon relative rotation therebetween by the establishment of a high resistance lubricant film between said members.

9. A rotation responsive electrical switch, comprising, in combination, first and second members one rotatably journalling the other thereof, a highly polished cylindrical surface on each said first and second member at said journal in the order of three to twenty-five micro-inch finish, the clearance between said first and second members at said journal being in the order of one thousandth of an inch, and means making electrical connection to each said first and second members whereby substantially an electrical open circuit condition exists between said members upon relative rotation therebetween and whereby substantially an electrical closed circuit condition exists between said members upon cessation of relative rotation therebetween.

10. In a machine having fixed and rotatable members relatively driven by motive means and with at least part of the machine being capable of being overloaded to stall said rotatable member, the method of controlling the drive of said rotatable member from said motive means by an electrical control circuit, comprising, in combination, the steps of making electrical connection to each of said members, providing smooth complementary cylindrical surfaces on said fixed and rotatable members with a clearance therebetween in the order of one thousandth of an inch to establish substantially an electrical open circuit between said members with said rotatable member rotating, and terminating the drive of said rotatable member upon said rotatable member becoming stalled to create substantially an electrical short circuit between said members.

11. In a machine having a first fixed member and a second rotatable member driven by motive means and with at least a part of the machine being capable of being overloaded to stall said rotatable member, the method of controlling the drive of said rotatable member from said motive means by an electrical control circuit, comprising, in combination, the steps of making electrical connection to each of said first and second members, providing smooth complementary cylindrical surfaces on said first and second members with a surface finish smoother than about twenty-five micro-inches and with a lubricant filled clearance therebetween in the order of one thousandth of an inch to establish substantially an electrical open circuit between said members with said second member rotating, and terminating the drive of said rotatable member upon said rotatable member becoming stalled to create substantially an electrical short circuit between said members.

12. In a machine having a first fixed member and a second rotatable member driven by motive means and with at least a part of the machine being capable of being overloaded to stall said rotatable member, the method of controlling said motive means by an electrical control circuit, comprising, in combination, the steps of making electrical connection to each of said first and second members, providing ground complementary cylindrical surfaces on said first and second members with a finish in the range of three to twenty-five micro-inches and with a lubricant filled clearance therebetween in the order of .0003 to .0007 inches to establish substantially an electrical open circuit between said members with said second member rotating, and de-energizing said motive means upon said rotatable member becoming stalled to create substantially an electrical short circuit between said members.

No references cited.